Figure 1:
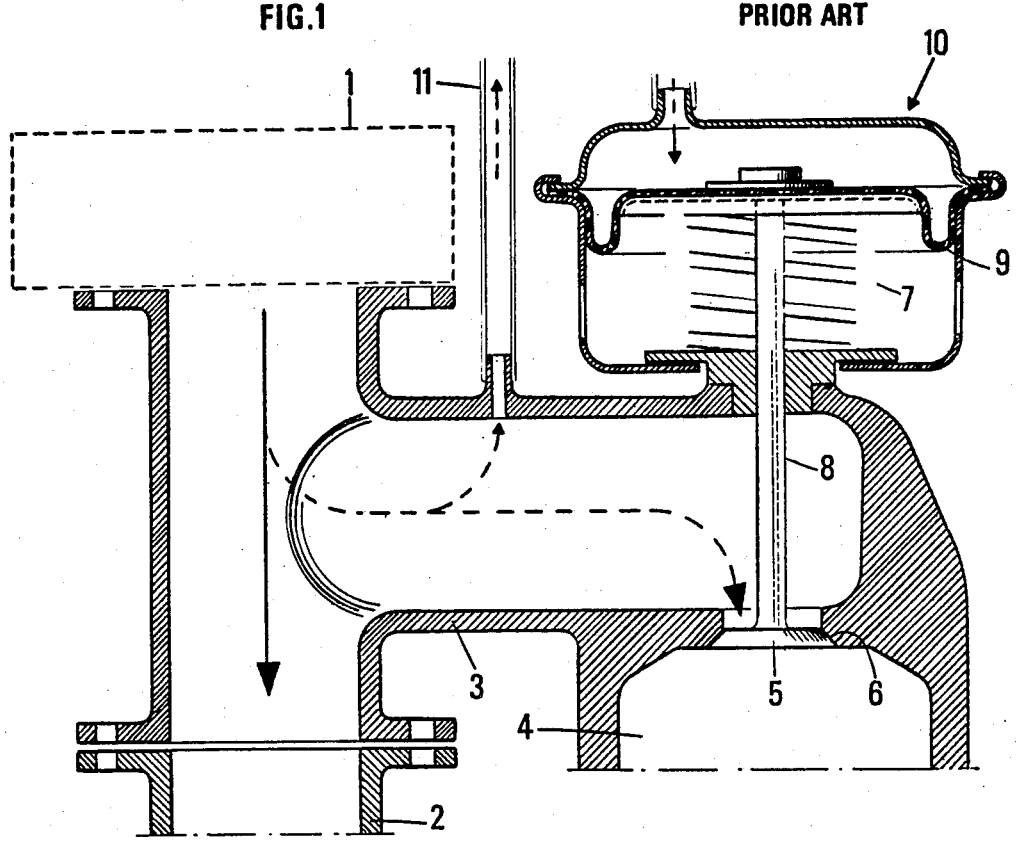

United States Patent [19]

Ecomard

[11] Patent Number: 4,658,587
[45] Date of Patent: Apr. 21, 1987

[54] TURBOCHARGED INTERNAL COMBUSTION ENGINE WITH A SYSTEM FOR REGULATING THE SUPERCHARGED AIR PRESSURE

[75] Inventor: André Ecomard, Marly le Roi, France

[73] Assignee: Institut Francais du Petrole, Reuil-Malmaison, France

[21] Appl. No.: 767,988

[22] Filed: Aug. 21, 1985

Related U.S. Application Data

[62] Division of Ser. No. 533,900, Sep. 20, 1983, Pat. No. 4,552,169.

[30] Foreign Application Priority Data

Jan. 21, 1980 [FR] France ............................. 80 01370

[51] Int. Cl.⁴ ............................................. F02B 37/12
[52] U.S. Cl. ..................................................... 60/602
[58] Field of Search ................. 60/600, 601, 602, 603; 137/115, 116

[56] References Cited

U.S. PATENT DOCUMENTS

| | | |
|---|---|---|
| 738,161 | 9/1903 | Christensen .......................... 137/115 |
| 2,091,596 | 8/1937 | Kluppel ............................ 137/115 X |
| 2,496,577 | 2/1950 | Cahill .................................. 137/115 |
| 3,035,408 | 5/1962 | Silver ..................................... 60/602 |
| 3,604,446 | 9/1971 | Brooks ............................... 137/115 |
| 3,751,190 | 8/1973 | Cecchi ............................ 137/115 X |
| 4,311,008 | 1/1982 | Yamada .................................. 60/602 |

Primary Examiner—Michael Koczo
Attorney, Agent, or Firm—Millen & White

[57] ABSTRACT

This device comprises a pressure controller connected to the fluid source through a first calibrated aperture. This pressure controller controls a valve located on a by-pass circuit connected in parallel with the utilization circuit, and is provided with a second calibrated aperture for fluid discharge and with means for closing said second aperture when the pressure in the controller reaches a set value lower than the pressure required for actuating the by-pass valve. The use of this device is particularly suitable in supercharged engines.

5 Claims, 6 Drawing Figures

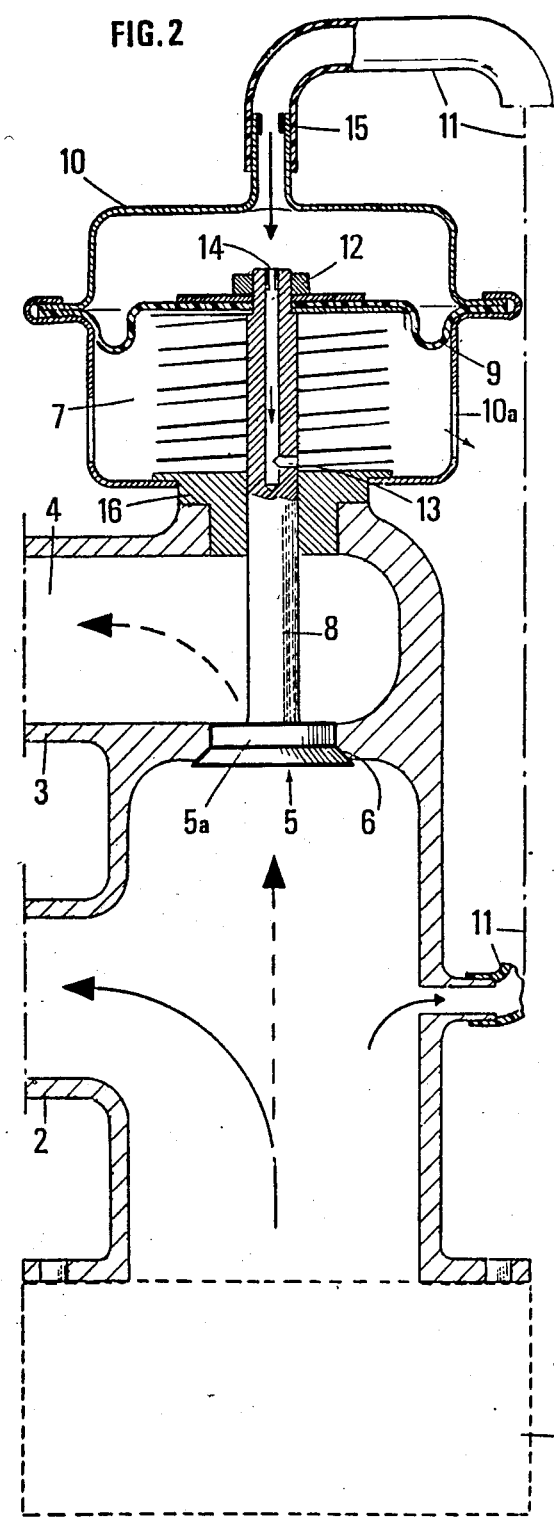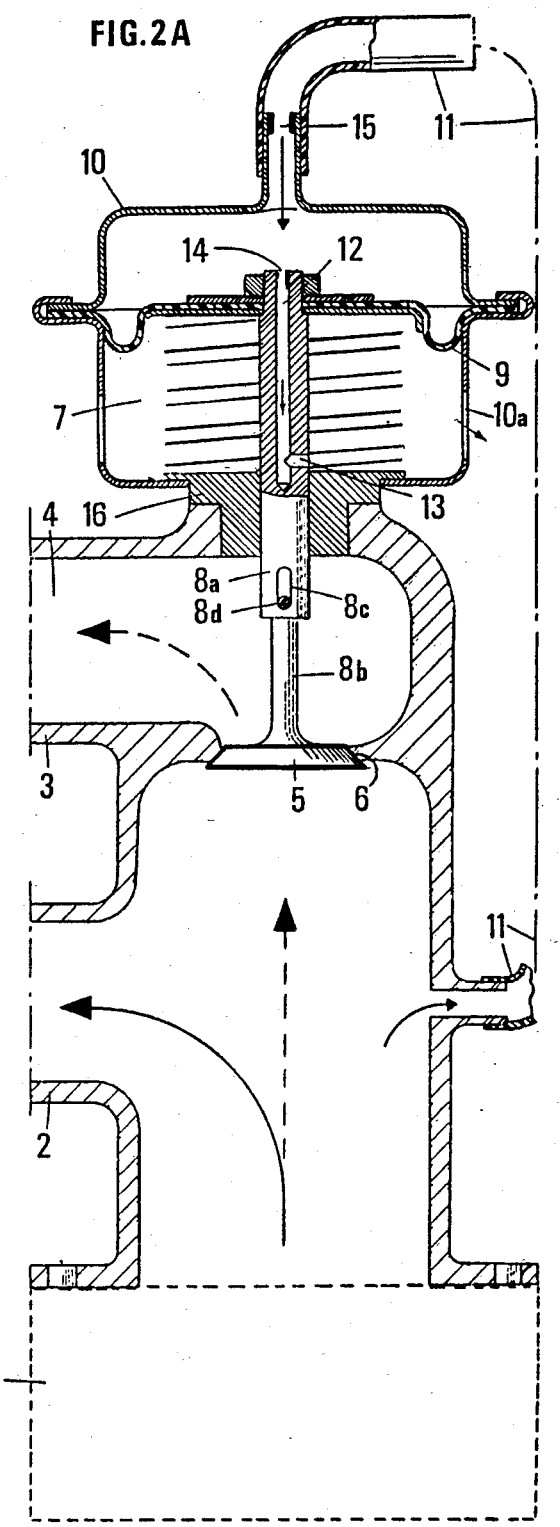

TURBOCHARGED INTERNAL COMBUSTION ENGINE WITH A SYSTEM FOR REGULATING THE SUPERCHARGED AIR PRESSURE

This is a division of application Ser. No. 533,900, filed Sept. 20, 1983, U.S. Pat. No. 4,552,169.

The present invention relates to a device for regulating the pressure of a fluid supplied to a feeding circuit from a source of fluid.

Devices for regulating the pressure of a fluid supplied from a source of fluid are already known in the art. According to a first embodiment, described in U.S. Pat. No. 3 020 925, a valve connected in series with the source is used. This valve is actuated by a deformable membrane on the sides of which are applied pressures related to the fluid pressures prevailing upstream and downstream of the valve respectively. Such a device thus simultaneously changes the flow rate of the fluid delivered by the source.

Other devices which also make use of an element connected in series with the fluid supply source are for example described in U.S. Pat. No. 3 272 227 and in the Publication "Regelungstechnische Praxis", Vol. 2 No. 3, Munich, September 1960, pages 111 to 114 under the heading "Oertliche Druckluftregelung mit Reduzierstationen" by J. RUSCHENWEYH.

According to another embodiment described, for example, in U.S. Pat. No. 2 883 998, or in French Pat. No. 1 337 654, the pressure regulation is obtained by actuating an element which closes a by-pass circuit connected with the fluid source in parallel with the fluid utilization circuit.

Prior art devices of this type suffer from an unstable operation at the time of opening the obturation element and this results mostly in an untimely opening of this obturation element.

The invention concerns a device of the type comprising a by-pass circuit connected to the fluid source, and actuated by an obturation element whose opening limits to a predetermined value the fluid pressure in the utilization circuit, this device avoiding the above indicated drawbacks and permitting, in particular a complete opening of the obturation element.

Figure 5:
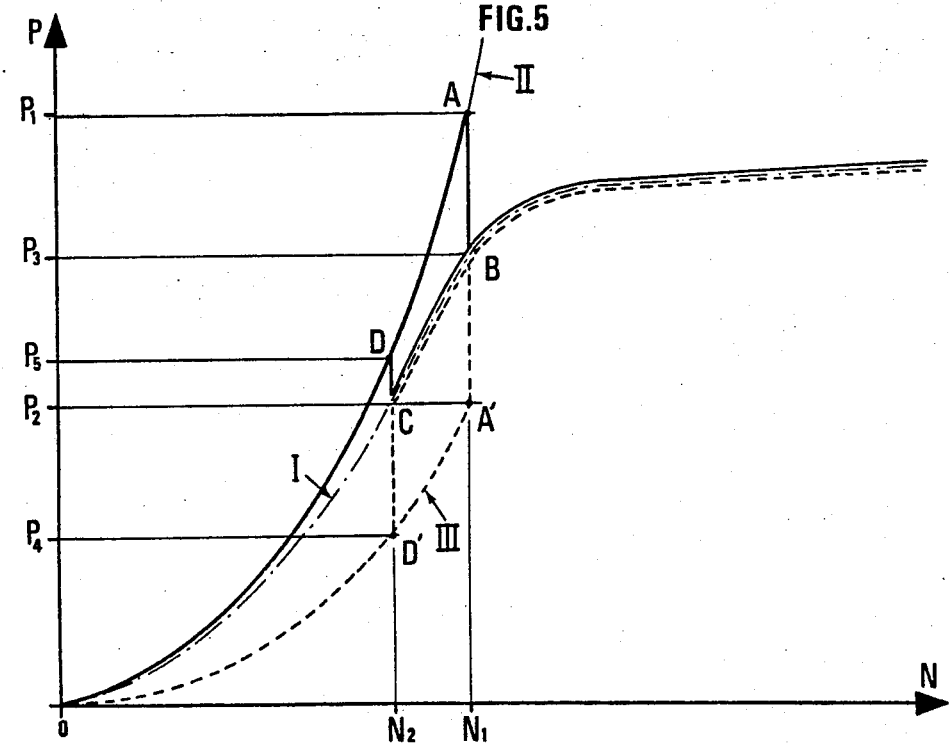
Figure 3:
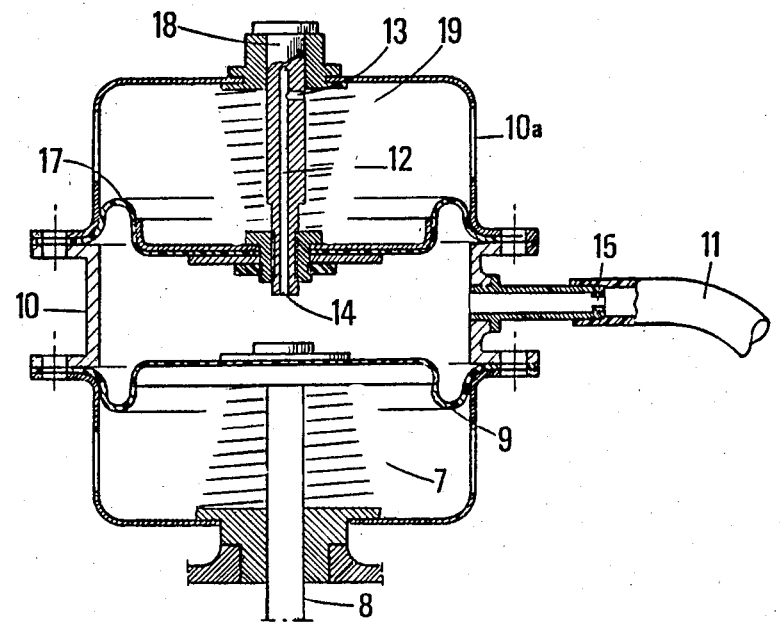
Figure 4:
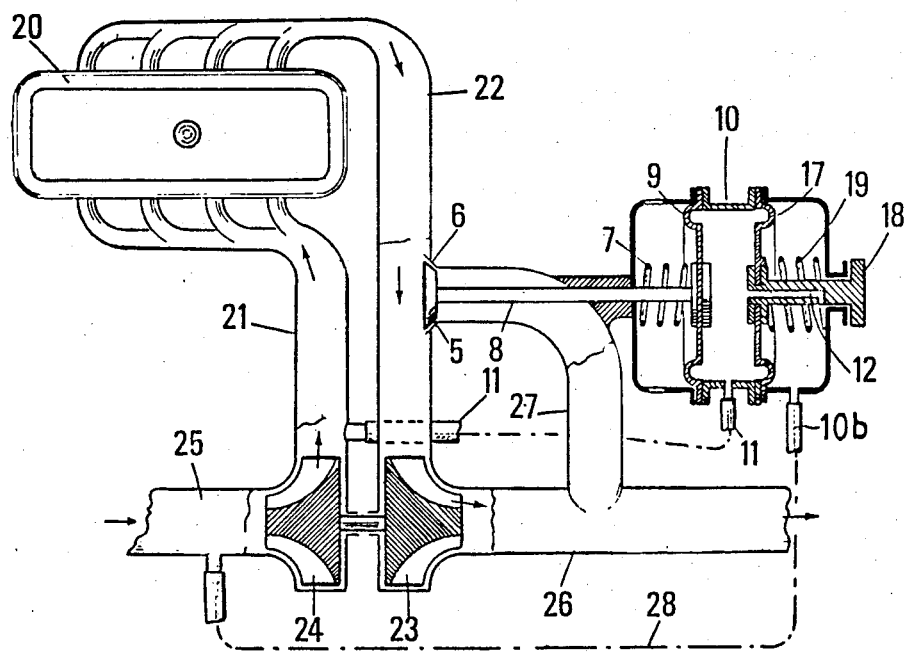

The invention will be readily understood from the following description illustrated by the accompanying drawings, wherein;

FIG. 1 diagrammatically shows a prior art device,
FIG. 2 illustrates a first embodiment of the invention,
FIG. 2A is a modification of the embodiment of FIG. 2,
FIG. 3 shows a second embodiment of the invention,
FIG. 4 illustrates the application of the invention to the regulation of a turbo-compressor equipping a supercharged internal combustion engine,
FIG. 5 illustrates the operation of the assembly shown in FIG. 4.

Throughout the different drawings the same references have been used to designate the same elements.

FIG. 1 is a diagrammatic cross-section of a prior art device for regulating the pressure of the fluid delivered by a fluid source 1. This fluid is, for example, but not limitatively, pressurized air feeding a working or utilization circuit to which the source 1 is connected through a main pipe 2.

The regulation circuit comprises a by-pass pipe 3 connected to the source 1 in parallel with the main pipe 1 and opening for example to atmosphere through its free end 4. An obturation element, such as a valve 5 co-operating with a seat 6, provides for the closure of the pipe 3. A calibrated spring 7 urges the valve 5 to its closed position, illustrated in FIG. 1. The stem 8 is secured to the moveable wall 9 of a pressure controller 10 connected to the fluid supply through a pipe 11.

The operation of the device is simple. As long as the fluid pressure delivered by the source 1 remains lower than a predetermined value, corresponding to the calibration value of the spring 7, the valve 5 is held in contact with the valve seat 6 by the action of the spring 7 on the stem 8. The whole fluid delivered by the source 1 flows through the pipe 2 as indicated by the arrows in solid line.

When the fluid pressure is higher than the predetermined value, the pressure controller 10 displaces the valve 5 against the action of the spring 7, thus opening the valve 5. A fraction of the fluid delivered by the source 1 is discharged through the opening 4 and the pressure in the pipe 2 is established at a value substantially equal to the predetermined value.

It is clearly apparent that, when the fluid pressure reaches while rising the predetermined value, the action of the pressure controller 10 on the valve stem 8 first substantially balances the action of the spring 7 and the valve 5 is then maintained substantially strainless on its seat 6. Experience shows that fluid leakage occur at the level of the valve whose opening is not complete.

This drawback is obviated by using the device according to the invention a first embodiment of which is illustrated in FIG. 2.

In this embodiment the control stem 8 of the valve 5 is provided with an axial bore. This bore or duct 12 communicates, through a calibrated aperture 14, with the inner space of the pressure controller 10 on the side of the membrane 9 opposite to the spring 7. At its other end the bore 12 has a radial aperture 13. The level of this aperture 13 on the stem 8 is such that in the closed position of the valve, this aperture is free and the fluid flows through the pipe 11, the pressure controller 10 and the duct 12, before being discharged, through the aperture 13, to the outside of the gauge 10 which is provided with apertures 10a in communication with the atmosphere.

The operation of the device is described below.

The obturation element being closed and the pressure of the fluid delivered by the source 1 being lower than a predetermined value, the fluid flows essentially through the main pipe 11 and through the aperture 15 into the pressure controller 10 on the side of the membrane 9 opposite to the spring 7, before being discharged through the duct 12. The pressure $P_c$ inside the pressure controller 10 is then determined by the formula $$P_c = \frac{P}{1 + \frac{s^2}{S^2}}$$

where P is the relative pressure of the fluid delivered by the source 1, s is the cross-section of the calibrated aperture 14, and S the cross-section of the calibrated aperture 15.

Under these conditions, as long as the fluid flows through the bore 12, the pressure $P_c$ remains lower than P.

When the pressure P of the fluid delivered by the source 1 increases, the pressure $P_c$ rises to a critical value which is the calibration value of the spring 7. The displacement of the stem 8 which controls the valve 5 obturates the aperture 13 by the guide sleeve 16, thus interrupting the fluid flow through the duct 12.

The pressure $P_c$ within the pressure controller 10 then rises suddenly and becomes equal to the pressure P of the fluid delivered by the source 1. This causes a sudden displacement of the stem 8 which opens the valve 5 thus limiting the pressure of the fluid feeding the pipe 2.

In this embodiment the valve 5 comprises a cylindrical extension 5a which maintains the pipe 3 closed during the slight displacement of the stem 8 corresponding to the closure of the aperture 13 of the duct 12.

FIG. 2A shows another embodiment wherein the control stem of the valve 5 is formed by two parts or elements 8a and 8b. One of these elements is provided with a slot 8c which co-operates with a stud 8d, integral with the other element. In this embodiment, when the actions of the spring 7 and of the pressure on the stem 8a balance each other the valve 5 remains tightly applied against its seat until the aperture 13 is completely closed by the action of the pressure delivered by the source 1.

FIG. 3 illustrates a second embodiment of the invention. In this drawing only the elements necessary to the displacement of the stem 8 controlling the valve 5 have been shown.

As in the above-described embodiment, the control stem 8 is integral with the movable wall or membrane 9 of a pressure controller and is subjected to the action of the spring 7 urging the valve against its seat. The pipe 11 supplies fluid under pressure to the pressure controller 10 through the calibrated aperture 15. The pressure controller 10 comprises a second movable wall secured to a sliding member 18. This member is provided with a calibrated axial bore 12 having a first end opening through an aperture 14 in the pressure controller 10 between the two movable walls 9 and 17 and a second end communicating with the space outside the pressure controller 10 through a radial aperture 13.

A spring 19 co-operates with the sliding member 18 so as to maintain it in the illustrated position, thus permitting fluid to flow through the aperture 13.

The spring 19 is calibrated at a lower value than the calibration value of the spring 7.

The operation is indicated below, the device being initially in the position shown in FIG. 3 with the obturating element 5 held in its closed position. As long as the pressure P of the fluid delivered by the source 1 remains lower than a predetermined value, the fluid flows through the pipe 11, the pressure controller 10 and the pipe 12 before being discharged through the opening 13. The pressure $P_c$ inside the pressure controller 10 is established at a value lower than P, depending on the calibrated respective cross-sections S of the aperture 15 and s of the bore 12. When the pressure P rises and the pressure $P_c$ reaches a critical value corresponding to the calibration value of the spring 19, the sliding member 18 is displaced upwardly, thus obturating the aperture 13 and interrupting the fluid flow through the pressure controller 10. The pressure $P_c$ rises suddenly to the value P. The control rod 8 is in turn displaced and actuates the obturation element 5.

FIG. 4 shows an example of appliction of the invention to the automatic regulation of the fluid supply of a turbine driven by the exhaust gases of an internal combustion engine, this turbine actuating a compressor which delivers the air required for the engine operation.

In FIG. 4 reference 20 designates and internal combustion engine fed with gas such as air or a carburetted mixture, through an inlet pipe 21. For sake of clarity, the fuel supply means have not been shown in the drawing. These means may be a carburetor or fuel injection means and located either upflow or downflow of the compressor as it is well known in the art. The exhaust gases are discharged through an outlet pipe 22.

Let be recalled that supercharging of an engine 20 may be achieved by means of a compressor 24 driven in rotation by a turbine 23 which is driven by the engine exhaust gases.

In other words the gas flow rate and pressure produced by the compressor 24 are related to the running speed N of the engine.

The characteristics of the turbine-compressor assembly are generally so selected as to deliver the maximum driving torque at a predetermined value $N_1$ of the running speed of the engine. This leads to a control of the rotation speed of the turbine in dependence on the exhaust gases flow rate through this turbine at engine running speeds higher than $N_1$.

It is known to use to this end a by-pass circuit of the engine exhaust gases, comprising a bypass pipe 27 which connects the inlet with the outlet of the turbine 23, an obturation element 5 of the by-pass pipe and control means adapted to open the obturation element at high running speeds of the engine, so as to directly discharge a determined fraction of the exhaust gases from pipe 22 to exhaust 26.

According to the selected embodiment, the control means will be actuated in response to the pressure at the turbine inlet, or in relation with the outlet pressure of the compressor, so as to obtain a determined law of variation of the pressure at the compressor outlet.

With a prior art control device like that illustrated in FIG. 1, the pipe 11 being connected with the compressor outlet, the evolution of the gas pressure P at the compressor outlet, in relation with the engine running speed N, is shown by the curve I drawn in mixed line in FIG. 5. It appears that at running speed lower than $N_1$ this curve is quite distinct from the curve II drawn in thin line which represents the function $P=f(N)$ when the obturation element is held perfectly closed, i.e. when the valve 5 is urged with sufficient force against its seat 6. This difference which results from a premature opening of the obturation element 5, as above indicated, shows that at low running speeds of the engine the energy recovered from the exhaust gases is not maximum.

To obviate this drawback the device according to the invention is used to control the valve 5. In the embodiment diagrammatically illustrated in FIG. 4, the control device corresponds to the embodiment shown in FIG. 3. The pipe 11 connects the compressor outlet 24 to the pressure controller 10, while a pipe 28 recycles to the inlet of the compressor the gases which have flown through the duct 12 provided in the sliding member 18.

The operation of this assembly is described below with reference to FIGS. 3, 4 and 5.

The ratio of the respective cross-sections of the calibrated aperture 15 and of the duct 12, as well as the calibration pressure of the spring 19 have been so selected that closure of the aperture 13 (FIG. 3) occurs at the running speed $N_1$ of the engine.

It is first assumed that the engine running speed increases to the value $N_1$.

The pressure $P_c$ within the pressure controller 10 varies along the portion OA' of the curve III drawn in broken line. This pressure $P_c$ is too small to compress the springs 7 and 19. The valve 5 is firmly maintained against its seat 6 by the action of the spring 7, preventing any gas leakage into the by-pass pipe 27. The pressure P at the compressor outlet varies along the portion OA of the curve II. When the running speed of the engine reaches the value $N_1$, the pressure P at the compressor outlet reaches the value $P_1$ and the pressure $P_c$ in the pressure controller 10 reaches the calibration pressure $P_2$ of the spring 19. This causes a displacement of the sliding member 18 and the interruption of the gas flow through the duct 12.

The pressure $P_c$ in the pressure controller 10 increases and becomes equal to the pressure P at the outlet of the compressor 24 and greater than the pressure corresponding to the calibration value of the spring 7, thus producing a sudden opening of the valve 5.

Experience shows that the pressure is suddenly established at a value $P_3$ comprised between $P_1$ and $P_2$ corresponding to the point B which is substantially on the curve I.

An additional increase of the engine running speed results in corresponding increases of the pressures P and $P_c$ up to a regulation value which is a function of the flow rate of the exhaust gases diverted through the pipe 27. Consequently at running speeds higher than $N_1$ the value of the pressure at the outlet of the compressor 24 and within the pressure controller 10 substantially follows the curve I.

It is thus apparent that at low running speed the device according to the invention provides for an increased power recovery from the exhaust gases and thus improves the engine supercharging.

The so-recovered power is substantially proportional to the area delimited between the curves I and II, i.e. to the area OAB.

When the engine running speed decreases starting from a value higher than $N_1$ it can be experimentally ascertained that the pressure at the outlet of the compressor 24, and thus within the pressure controller 10, decreases, while following the curve I, until a value $N_2$ of the engine running speed is reached, i.e. down to point C at which the value $P_2$ of the pressure corresponds to the calibration value of the spring 19. The sliding member is displaced in the opposite direction, so that gas can flow through the duct 12. The pressure in the pressure controller 10 suddenly decreases to the value $P_4$ corresponding to the point D'. Thus the valve 5 is urged against its seat 6 by the spring 7 and the pressure at the outlet of the compressor increases up to the value $P_5$ corresponding to the point D. When the engine running speed decreases below the value $N_2$, the pressure within the pressure controller 10 decreases along the portion D'0 of the curve III, while the pressure at the compressor outlet varies according to the portion D0 of the curve II.

The value $N_2$ depends on the characteristics of the turbine-compressor assembly and on the ratio of the cross-section of the aperture 15 to the cross-section of the duct 12. The value $N_2$ is generally 1 to 2 r.p.s. less than the value $N_1$.

The embodiment illustrated in FIG. 4 offers the advantage of introducing into the pressure controller gases at a temperature lower than the temperature of the exhaust gases; however it would be possible, without departing from the scope of the present invention, to connect the pipes 11 and 28 to the inlet and the outlet of the turbine 23, respectively.

What is claimed is:

1. In a system for regulating fluid pressure in the air intake of an internal combustion engine, wherein the engine has an air intake line and an exhaust line, and wherein the system includes a turbocharger having a compressor in the air intake line of the engine and a driving turbine in the exhaust line of the engine with the driving turbine rotating the compressor, there being an upstream port in the air intake positioned upstream of the compressor and a downstream port positioned downstream of the compressor and upstream of the engine, the system comprising a by-pass fluid conduit for bypassing said driving turbine, the bypass fluid conduit being connected in parallel with said exhaust line of said internal combustion engine; obturating means adapted for obturating said bypass conduit, and control means for automatically moving said obturating means to an open position when the pressure in the air intake line is higher than a predetermined value: the improvement being wherein said control means comprises a pressure controller connected to said upstream and downstream ports, said pressure controller having within a housing a first movable wall and a second movable wall, each having first and second sides, which define a fluid pressure receiving chamber between the first sides thereof, the fluid pressure receiving chamber having a first calibrated aperture therein connected to the downstream port, an opening in the housing on the second side of the second movable wall and being connected to the upstream port, calibrated first spring means for biasing said first movable wall, said obturating means comprising a valve with a valve stem connected to said first movable wall with the first spring means disposed for urging said first movable wall toward said second movable wall and for moving said valve into closed position; a second calibrated spring for urging the second wall toward the first movable wall, and a second calibrated aperture carried by and extending through said second wall to form a passageway beyond the second side of said second movable wall for allowing pressurized fluid to pass therethrough from the fluid pressure receiving chamber to communicate with said opening on the second side of the second movable wall, and passageway closing means juxtaposed with said passageway for closing off passage of fluid through said passageway when the pressure in said pressure receiving chamber increases to a level sufficient to displace said second movable wall a distance sufficient to close said passageway, whereby as the fluid pressure in said air intake line increases, an initial displacement of said second movable wall closes said passageway which causes a sudden rise in pressure in the fluid pressure receiving chamber so as to cause a full opening of the valve to thereby lower the pressure against the bias of said first spring means in the air intake of the internal combustion engine by diverting a partial flow through said by-pass conduit and away from the driving turbine.

2. A device of claim 1 wherein the device further includes a stem member secured to the second movable wall for movement therewith, the stem member having a bore therethrough which comprises said passageway, the bore communicating with a radial opening, a sleeve for slidably receiving the stem member with the radial opening in the stem member not blocked by the sleeve when the stem member is in a first position and blocked by the sleeve when the stem member is in a second position; the first position being when the second movable wall is not displaced against the bias of said second spring means and the second position being when the second movable wall is displaced against the bias of said second spring means.

3. A device as in claim 1 wherein said first spring means has a greater spring constant than said second spring means.

4. A device as in claim 3 wherein the pressure controller is constructed so that pressure in the pressure receiving chamber is equal to $P_c$, with $$P_c = \frac{P}{1 + \frac{s^2}{S^2}}$$

wherein P is the relative pressure delivered by the fluid pressure source, is the cross-section of the second calibrated aperture, and S is the cross-section of the first calibrated aperture, and wherein said spring means has a predetermined calibrated constant whereby when said pressure P is increased to cause the pressure $P_c$ to equal the calibrated constant of said spring means, the valve is opened.

5. A device as in claim 1 wherein the pressure controller is constructed so that pressure in the pressure receiving chamber is $$P_c = \frac{P}{1 + \frac{s^2}{S^2}}$$

where P is the relative pressure delivered by the fluid pressure source, $s^2$ is the cross-section of the second calibrated aperture, and S is the cross-section of the first calibrated aperture, and wherein said second spring means have a predetermined calibrated constant whereby when said pressure P is increased to cause the pressure $P_c$ to equal at least the calibrated constant of said second spring means, the valve is opened.

* * * * *